US012071862B2

(12) United States Patent
Snider et al.

(10) Patent No.: US 12,071,862 B2
(45) Date of Patent: Aug. 27, 2024

(54) VIBRATION DAMPING SYSTEM FOR TURBINE NOZZLE OR BLADE USING STACKED PLATE MEMBERS

(71) Applicant: General Electric Company, Schenectady, NY (US)

(72) Inventors: Zachary John Snider, Simpsonville, SC (US); John McConnell Delvaux, Fountain Inn, SC (US); James Tyson Balkcum, Taylors, SC (US); Brian Denver Potter, Greer, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/815,376

(22) Filed: Jul. 27, 2022

(65) Prior Publication Data

US 2024/0035387 A1 Feb. 1, 2024

(51) Int. Cl.
*F01D 5/26* (2006.01)
*F01D 9/04* (2006.01)

(52) U.S. Cl.
CPC ............... *F01D 5/26* (2013.01); *F01D 9/041* (2013.01); *F05D 2240/128* (2013.01); *F05D 2260/38* (2013.01); *F05D 2260/96* (2013.01)

(58) Field of Classification Search
CPC ... F01D 5/26; F01D 25/04; F01D 5/16; F01D 25/06
See application file for complete search history.

(56) References Cited

U.S. PATENT DOCUMENTS 2,999,669 A * 9/1961 McGinnis ................. F01D 5/16 416/500
5,820,343 A 10/1998 Kraft et al.
7,270,517 B2 9/2007 Garner
7,413,405 B2 8/2008 Busbey et al.
7,736,124 B2 6/2010 Bauer et al.
7,824,158 B2 11/2010 Bauer et al.
(Continued)

FOREIGN PATENT DOCUMENTS

DE 3109519 C2 12/1981
FR 981599 A 5/1951
(Continued)

*Primary Examiner* — Michael L Sehn
(74) *Attorney, Agent, or Firm* — Charlotte Wilson; James Pemrick; Hoffman Warnick LLC

(57) ABSTRACT

A vibration damping system includes a vibration damping element for a turbine nozzle or blade. A body opening extends through the turbine nozzle or blade between the tip end and the base end thereof, e.g., through the airfoil among potentially other parts of the nozzle or blade. A vibration damping element includes a plurality of stacked plate members within the body opening. Each plate member is in surface contact with at least one adjacent plate member to cause friction that dampens vibration of the nozzle or blade. The body opening has an inner dimension, and each plate member has an outer dimension sized to frictionally engage the inner dimension of the body opening to damp vibration. Plate members may each include a central opening therein, and a fixed elongated body or cable may extend through the central openings. The damping element may alternatively include a helical metal ribbon spring.

22 Claims, 13 Drawing Sheets

(56) References Cited

U.S. PATENT DOCUMENTS

| | | | |
|---|---|---|---|
| 9,657,591 | B2 | 5/2017 | Schleif et al. |
| 9,657,717 | B2 | 5/2017 | Ollgaard et al. |
| 11,187,089 | B2 | 11/2021 | Wondrasek et al. |
| 2017/0067350 | A1 | 3/2017 | Kareff et al. |
| 2021/0172325 | A1 | 6/2021 | Wondrasek et al. |
| 2021/0254478 | A1 | 8/2021 | Chakrabarti et al. |

FOREIGN PATENT DOCUMENTS

| | | | |
|---|---|---|---|
| JP | 2014084676 | A | 5/2014 |
| SU | 1326783 | A1 | 7/1987 |

* cited by examiner

VIBRATION DAMPING SYSTEM FOR TURBINE NOZZLE OR BLADE USING STACKED PLATE MEMBERS

TECHNICAL FIELD

The disclosure relates generally to damping vibration in a turbine nozzle or blade. Further, the disclosure relates to a vibration damping system including a vibration damping element using a plurality of stacked plate members within a body opening in the turbine nozzle or blade. A vibration damping element may also include a helical metal ribbon spring.

BACKGROUND

One concern in turbine operation is the tendency of the turbine blades or nozzles to undergo vibrational stress during operation. In many installations, turbines are operated under conditions of frequent acceleration and deceleration. During acceleration or deceleration of the turbine, the airfoils of the blades are, momentarily at least, subjected to vibrational stresses at certain frequencies and in many cases to vibrational stresses at secondary or tertiary frequencies. Nozzle airfoils experience similar vibrational stress. Variations in gas temperature, pressure, and/or density, for example, can excite vibrations throughout the rotor assembly, especially within the nozzle or blade airfoils. Gas exiting upstream of the turbine and/or compressor sections in a periodic, or "pulsating," manner can also excite undesirable vibrations. When an airfoil is subjected to vibrational stress, its amplitude of vibration can readily build up to a point which may negatively affect gas turbine operations or component life.

BRIEF DESCRIPTION

All aspects, examples and features mentioned below can be combined in any technically possible way.

An aspect of the disclosure provides a vibration damping element for a vibration damping system for a turbine nozzle or blade, the vibration damping element comprising: a plurality of stacked plate members within a body opening in the turbine nozzle or blade, each plate member in surface contact with at least one adjacent plate member, the body opening having an inner dimension and each plate member having an outer dimension sized to frictionally engage the inner dimension of the body opening to damp vibration.

Another aspect of the disclosure includes any of the preceding aspects, and each plate member of the plurality of stacked plate members includes a central opening therein, and further comprising an elongated body extending within and fixed relative to the body opening, the elongated body extending through the central opening in each plate member of the plurality of stacked plate members.

Another aspect of the disclosure includes any of the preceding aspects, and each of the plurality of stacked plate members are cupped and slide freely on the elongated body.

Another aspect of the disclosure includes any of the preceding aspects, and the plurality of stacked plate members is separated into at least two groups; and wherein a retention member on the elongated body engages with an endmost plate member of each group to prevent the respective group from moving relative to a length of the elongated body.

Another aspect of the disclosure includes any of the preceding aspects, and the body opening extends through a body of the turbine nozzle or blade between a tip end and a base end thereof; and wherein the elongated body has a first, free end and a second end fixed relative to one of the base end and the tip end.

Another aspect of the disclosure includes any of the preceding aspects, and the second end of the elongated body is fixed relative to the tip end of the body of the turbine nozzle or blade, and the first, free end extends towards the base end; and further comprising a retention member on the elongated body to prevent the plurality of stacked plate members from moving relative to a length of the elongated body.

Another aspect of the disclosure includes any of the preceding aspects, and the second end of the elongated body is fixed relative to the base end of the body of the turbine nozzle or blade, and the first, free end extends towards the tip end; and further comprising a retention member on the elongated body to prevent the plurality of stacked plate members from moving relative to a length of the elongated body.

Another aspect of the disclosure includes any of the preceding aspects, and the elongated body is hollow along a length thereof, and further comprising: a cable extending through the hollow length of the elongated body; and a retainer coupled to an end of the cable, the retainer engaging with an endmost plate of the plurality of stacked plate members on the elongated body to retain the plurality of stacked plate members on the elongated body.

Another aspect of the disclosure includes any of the preceding aspects, and further comprising: a cable extending through the plurality of stacked plate members; and a retainer coupled to an end of the cable, the retainer engaging with an endmost plate of the plurality of stacked plate members to retain the plurality of stacked plate members on the cable.

An aspect of the disclosure includes a vibration damping system for a turbine nozzle or blade, comprising: a body opening extending through a body of the turbine nozzle or blade between a tip end and a base end thereof; and a vibration damping element disposed in the body opening, the vibration damping element including a plurality of stacked plate members within the body opening in the turbine nozzle or blade, each plate member in surface contact with at least one adjacent plate member, wherein the body opening has an inner dimension and each plate member of the plurality of stacked plate members has an outer dimension sized to frictionally engage the inner dimension of the body opening to damp vibration.

Another aspect of the disclosure includes any of the preceding aspects, and each plate member of the plurality of stacked plate members includes a central opening therein; and further comprising an elongated body extending within and fixed relative to the body opening, the elongated body extending through the central opening each plate member.

Another aspect of the disclosure includes any of the preceding aspects, and the plurality of stacked plate members are each cupped and slide freely on the elongated body.

Another aspect of the disclosure includes any of the preceding aspects, and the plurality of stacked plate members is separated into at least two groups; and wherein a retention member on the elongated body engages with an endmost plate member of each group to prevent the respective group from moving relative to a length of the elongated body.

Another aspect of the disclosure includes any of the preceding aspects, wherein the elongated body has a first, free end and a second end fixed relative to one of the base end and the tip end.

Another aspect of the disclosure includes any of the preceding aspects, and the second end of the elongated body is fixed relative to the tip end of the body of the turbine nozzle or blade, and the first, free end extends towards the base end; and further comprising a retention member on the elongated body to prevent the plurality of stacked plate members from moving relative to a length of the elongated body.

Another aspect of the disclosure includes any of the preceding aspects, and the second end of the elongated body is fixed relative to the base end of the body of the turbine nozzle or blade, and the first, free end extends towards the tip end; and further comprising a retention member on the elongated body to prevent the plurality of stacked plate members from moving relative to a length of the elongated body.

Another aspect of the disclosure includes any of the preceding aspects, and the elongated body is hollow along a length thereof, and further comprising: a cable extending through the hollow length of the elongated body; and a retainer coupled to an end of the cable, the retainer engaging with an endmost plate of the plurality of stacked plate members on the elongated body to retain the plurality of stacked plate members on the elongated body.

Another aspect of the disclosure includes any of the preceding aspects, and further comprising: a cable extending through the plurality of stacked plate members; and a retainer coupled to an end of the cable, the retainer engaging with an endmost plate of the plurality of stacked plate members to retain the plurality of stacked plate members on the cable.

Another aspect of the disclosure includes any of the preceding aspects, and the body opening has a dimension greater than a corresponding outer dimension of the elongated body, allowing the elongated body a limited movement range within the body opening to further dampen vibrations through deflection thereof within the body opening.

Another aspect of the disclosure includes a turbine nozzle or blade comprising the vibration damping system of any of the preceding aspects.

An aspect of the disclosure includes a vibration damping element for a vibration damping system for a turbine nozzle or blade, the vibration damping element comprising: a helical metal ribbon spring within a body opening in the turbine nozzle or blade, the body opening having an inner surface having an inner dimension and the helical metal ribbon spring having an outer dimension sized to frictionally engage the inner surface of the body opening to damp vibration.

Another aspect of the disclosure includes a method of installing a vibration damping element in a body opening in a turbine nozzle or blade, the method comprising: positioning a cable through a central opening in each of a plurality of stacked plate members, the cable including a retainer to retain the plurality of stacked plate members thereon; and positioning the plurality of stacked plate members with the cable therein into the body opening of the turbine nozzle or blade.

Another aspect of the disclosure includes any of the preceding aspects, and further comprising positioning a hollow elongated body over the cable and through the central opening of each of the plurality of stacked plate members; and wherein the positioning the plurality of stacked plate members into the body opening includes using the hollow elongated body to insert the plurality of stacked plate members.

Another aspect of the disclosure includes any of the preceding aspects, and further comprising removing the hollow elongated body from within the plurality of stacked plate members and the body opening, leaving the plurality of stacked plate members in the body opening.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
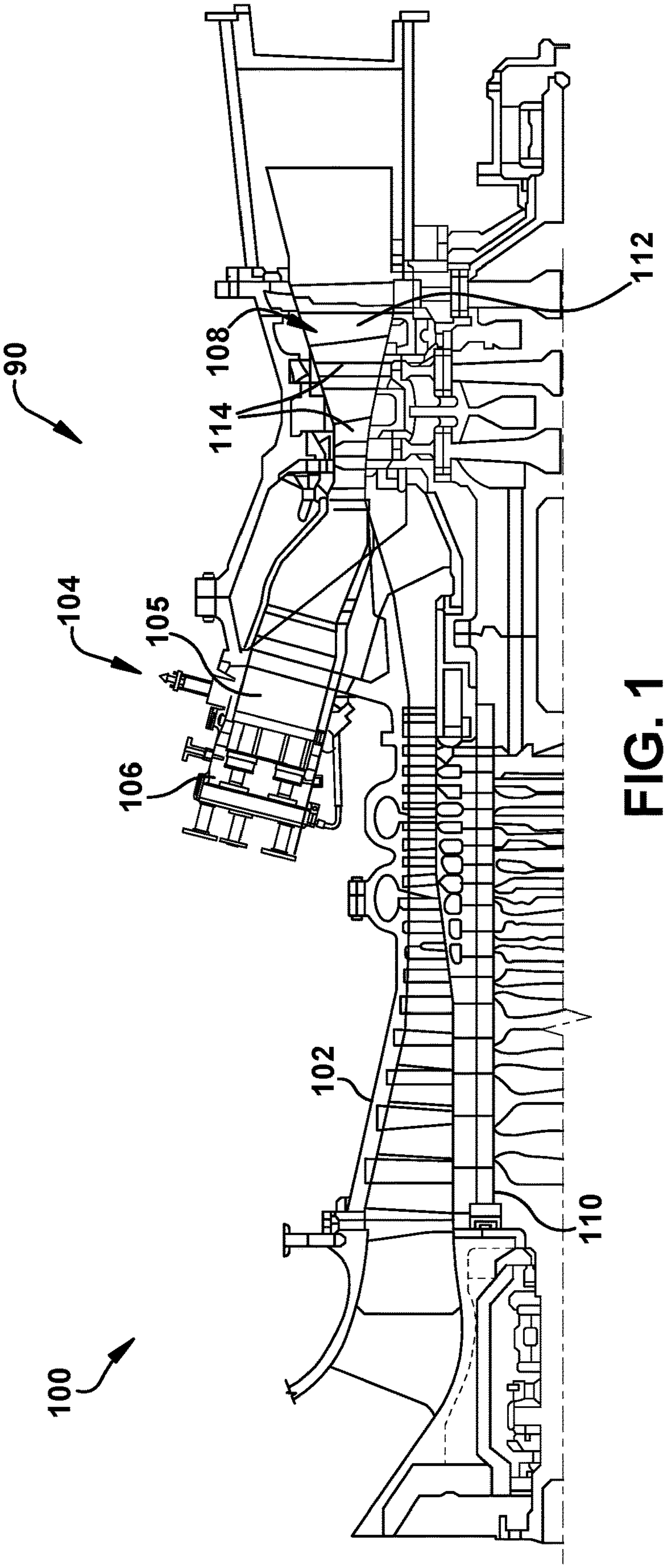
FIG. 1 shows a cross-sectional view of an illustrative turbomachine in the form of a gas turbine system.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide vibration damping systems including a vibration damping element for a turbine nozzle (stationary vane) or turbine blade (rotating blade). The systems may include a body opening extending through a body of the turbine nozzle or blade between the tip end and the base end thereof, e.g., through the airfoil among potentially other parts of the nozzle or blade. A vibration damping element includes a plurality of stacked plate members within the body opening in the turbine nozzle or blade. Each plate member is in surface contact with at least one adjacent plate member to cause friction that dampens vibration of the nozzle or blade. In addition, the body opening has an inner dimension and each plate member has an outer dimension sized to frictionally engage the inner dimension of the body opening to dampen vibration.

In certain embodiments, each plate member may include a central opening therein, and an elongated body may extend through the central opening of each plate member of the plurality of stacked plate members. The elongated body is fixed relative to the body opening. In an alternative embodiment, the vibration damping element includes a helical metal ribbon spring. Related methods of assembly are also disclosed. The vibration damping element including the stacked plate members or helical metal ribbon spring reduces nozzle or blade vibration with a simple arrangement and does not add much extra mass to the nozzle or blade. Accordingly, the vibration damping element does not add additional centrifugal force to the nozzle base end or blade tip end or require a change in nozzle or blade configuration.

Referring to the drawings, FIG. 1 is a cross-sectional view of an illustrative machine including a turbine(s) to which teachings of the disclosure can be applied. In FIG. 1, a turbomachine 90 in the form of a combustion turbine or gas turbine (GT) system 100 (hereinafter, "GT system 100") is shown. GT system 100 includes a compressor 102 and a combustor 104. Combustor 104 includes a combustion region 105 and a fuel nozzle section 106. GT system 100 also includes a turbine 108 and a common compressor/turbine shaft 110 (hereinafter referred to as "rotor 110").

GT system 100 may be a 7HA.03 engine, commercially available from General Electric Company, Greenville, S.C. The present disclosure is not limited to any one particular GT system and may be implemented in connection with other engines including, for example, the other HA, F, B, LM, GT, TM and E-class engine models of General Electric Company and engine models of other companies. More importantly, the teachings of the disclosure are not necessarily applicable to only a turbine in a GT system and may be applied to practically any type of industrial machine or other turbine, e.g., steam turbines, jet engines, compressors (as in FIG. 1), turbofans, turbochargers, etc. Hence, reference to turbine 108 of GT system 100 is merely for descriptive purposes and is not limiting.

Figure 2:
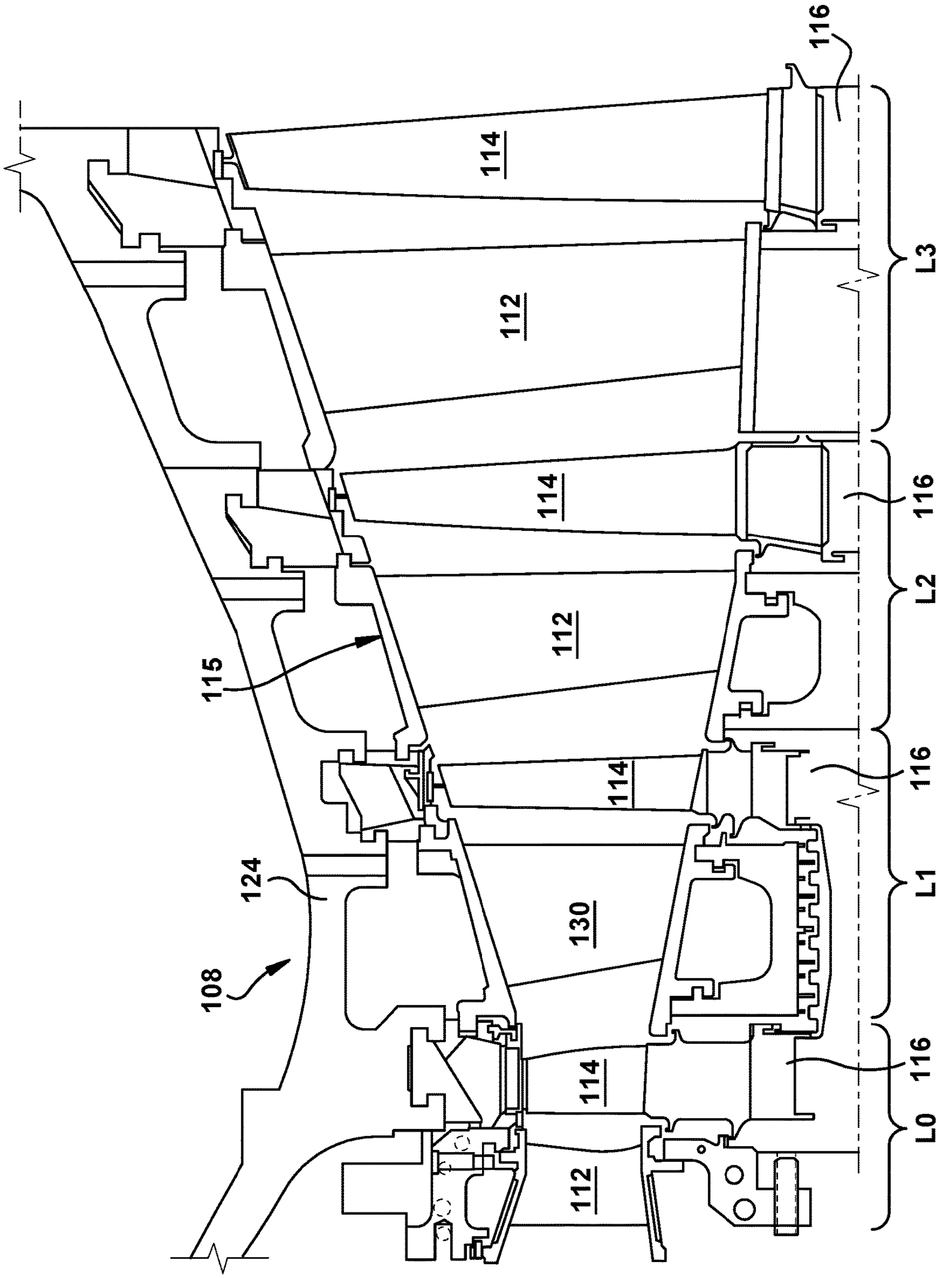
FIG. 2 shows a cross-sectional view of a portion of an illustrative turbine, according to embodiments of the disclosure.

FIG. 2 shows a cross-sectional view of an illustrative portion of turbine 108. In the example shown, turbine 108 includes four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is disposed adjacent the first stage L0 in an axial direction. Stage L2 is the third stage and is disposed adjacent the second stage L1 in an axial direction. Stage L3 is the fourth, last stage and is the largest (in a radial direction). It is to be understood that four stages are shown as one example only, and each turbine may have more or less than four stages.

A plurality of stationary turbine vanes or nozzles 112 (hereafter "nozzle 112," or "nozzles 112") may cooperate with a plurality of rotating turbine blades 114 (hereafter "blade 114," or "blades 114") to form each stage L0-L3 of turbine 108 and to define a portion of a working fluid path through turbine 108. Blades 114 in each stage are coupled to rotor 110 (FIG. 1), e.g., by a respective rotor wheel 116 that couples them circumferentially to rotor 110 (FIG. 1). That is, blades 114 are mechanically coupled in a circumferentially spaced manner to rotor 110, e.g., by rotor wheels 116. A static nozzle section 115 includes a plurality of stationary nozzles 112 mounted to a casing 124 and circumferentially spaced around rotor 110 (FIG. 1). It is recognized that blades 114 rotate with rotor 110 (FIG. 1) and thus experience centrifugal force, while nozzles 112 are static.

With reference to FIGS. 1 and 2, in operation, air flows through compressor 102, and pressurized air is supplied to combustor 104. Specifically, the pressurized air is supplied to fuel nozzle section 106 that is integral to combustor 104. Fuel nozzle section 106 is in flow communication with combustion region 105. Fuel nozzle section 106 is also in flow communication with a fuel source (not shown in FIG. 1) and channels fuel and air to combustion region 105. Combustor 104 ignites and combusts fuel to produce combustion gases. Combustor 104 is in flow communication with turbine 108, within which thermal energy from the combustion gas stream is converted to mechanical rotational energy by directing the combusted fuel (e.g., working fluid) into the working fluid path to turn blades 114. Turbine 108 is rotatably coupled to and drives rotor 110. Compressor 102 is rotatably coupled to rotor 110. At least one end of rotor 110 may extend axially away from compressor 102 or turbine 108 and may be attached to a load or machinery (not shown), such as, but not limited to, a generator, a load compressor, and/or another turbine.

Figure 3:
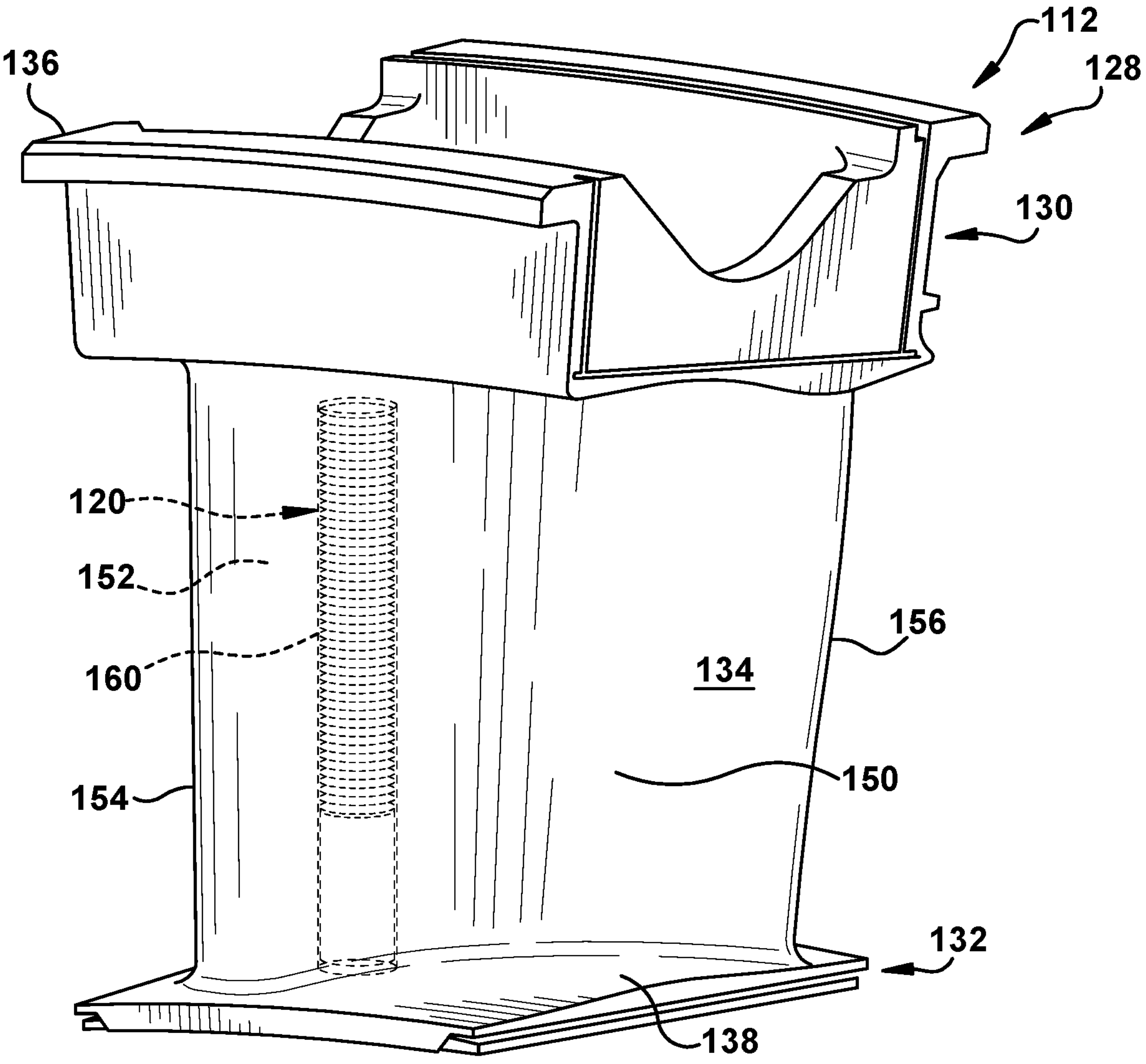
FIG. 3 shows a perspective view of an illustrative turbine nozzle including a vibration damping system, according to embodiments of the disclosure.
Figure 4:
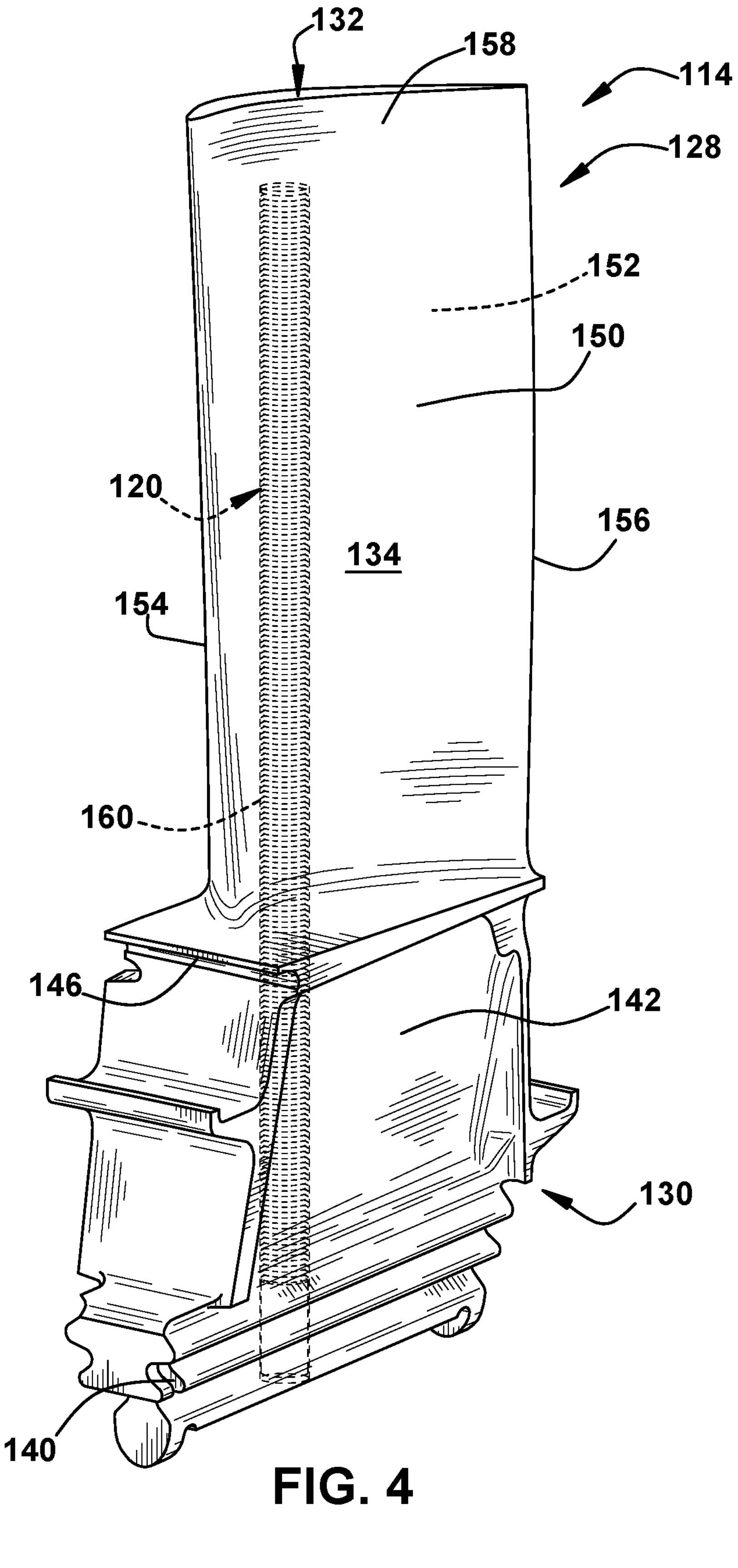
FIG. 4 shows a perspective view of an illustrative turbine blade including a vibration damping system, according to embodiments of the disclosure.

FIGS. 3 and 4 show perspective views, respectively, of a (stationary) nozzle 112 and a (rotating) blade 114, of the type in which embodiments of a vibration damping system 120 and a vibration damping element 166 of the present disclosure may be employed. As will be described herein, FIGS. 5, 8, 10-13, 15, 17 and 18 show schematic cross-sectional views of a nozzle 112 or blade 114 including vibration damping system 120, according to various embodiments of the disclosure.

Referring to FIGS. 3 and 4, each nozzle or blade 112, 114 includes a body 128 having a base end 130, a tip end 132, and an airfoil 134 extending between base end 130 and tip end 132. As shown in FIG. 3, nozzle 112 includes an outer endwall 136 at base end 130 and an inner endwall 138 at tip end 132. Outer endwall 136 couples to casing 124 (FIG. 2). As shown in FIG. 4, blade 114 includes a dovetail 140 at base end 130 by which blade 114 attaches to a rotor wheel 116 (FIG. 2) of rotor 110 (FIG. 2). Base end 130 of blade 114 may further include a shank 142 that extends between dovetail 140 and a platform 146. Platform 146 is disposed at the junction of airfoil 134 and shank 142 and defines a portion of the inboard boundary of the working fluid path (FIG. 2) through turbine 108.

It will be appreciated that airfoil 134 in nozzle 112 and blade 114 is the active component of the nozzle 112 or blade 114 that intercepts the flow of working fluid and, in the case of blades 114, induces rotor 110 (FIG. 1) to rotate. It will be seen that airfoil 134 of nozzle 112 and blade 114 includes a concave pressure side (PS) outer wall 150 and a circumferentially or laterally opposite convex suction side (SS) outer wall 152 extending axially between opposite leading and trailing edges 154, 156, respectively. Sidewalls 150 and 152 also extend in the radial direction from base end 130 (i.e., outer endwall 136 for nozzle 112 and platform 146 for blade 114) to tip end 132 (i.e., inner endwall 138 for nozzle 112 and a tip end 158 for blade 114). Note, in the example shown, blade 114 does not include a tip shroud; however, teachings of the disclosure are equally applicable to a blade including a tip shroud at tip end 158. Nozzle 112 and blade 114 shown in FIGS. 3-4 are illustrative only, and the teachings of the disclosure can be applied to a wide variety of nozzles and blades.

During operation of a turbine, nozzles 112 or blades 114 may be excited into vibration by a number of different forcing functions. For example, variations in working fluid temperature, pressure, and/or density can excite vibrations throughout the rotor assembly, especially within the airfoils and/or tips of the blades 114 or nozzles 112. Gas exiting upstream of the turbine and/or compressor sections in a periodic, or "pulsating," manner can also excite undesirable vibrations. The present disclosure aims to reduce the vibration of a stationary turbine nozzle 112 or rotating turbine blade 114 without significant change of nozzle or blade design.

Figure 5:
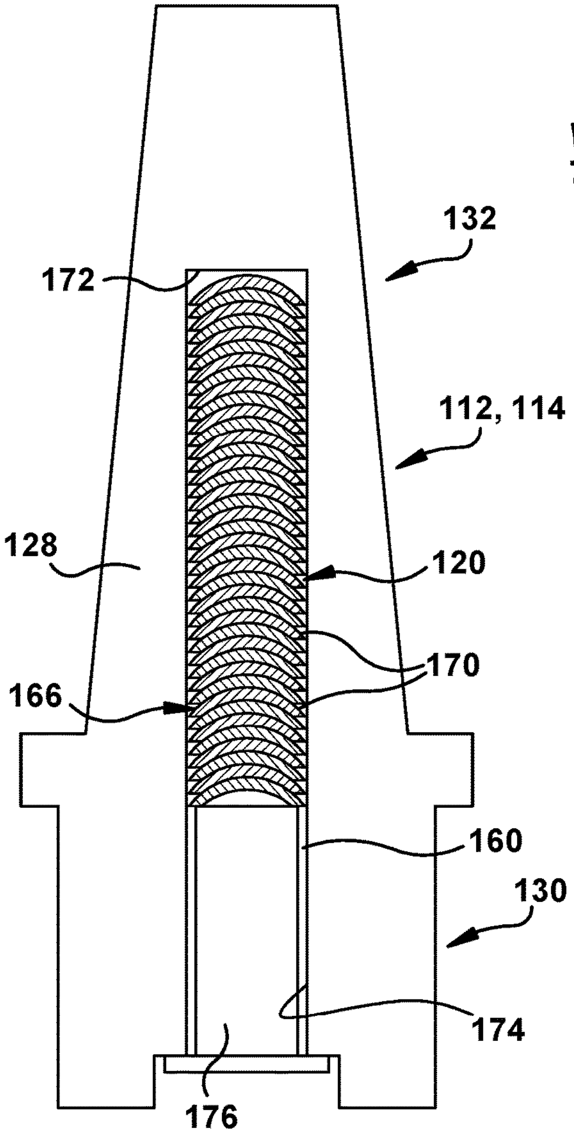
FIG. 5 shows a schematic cross-sectional view of a turbine nozzle or blade having a vibration damping system including a vibration damping element including a plurality of stacked plate members, according to embodiments of the disclosure.

FIG. 5 shows a schematic cross-sectional view of nozzle 112 or blade 114 including vibration damping system 120 according to embodiments of the disclosure. (Nozzle 112 in the schematic cross-sectional views of FIGS. 5, 8, 10-13, 15, 17 and 18 is shown flipped vertically compared to that shown in FIG. 3 and without inner endwall 138, for ease of description. It should be understood that references to base end 130 and tip end 132 may be reversed for nozzle 112, as compared to blade 114.) Vibration damping system 120 for turbine nozzle 112 or blade 114 may include a body opening 160 extending through body 128 between tip end 132 and base end 130 thereof and through airfoil 134. Body opening 160 may span part of the distance between base end 130 and tip end 132, or it may extend through one or more of base end 130 or tip end 132. Body opening 160 may originate at base end 130 of blade 114 or may originate at tip end 132 of nozzle 112 (as shown in FIG. 3).

Body opening 160 may be defined in any part of any structure of body 128. For example, where body 128 includes an internal partition wall (not shown), for example, for defining a cooling circuit therein, body opening 160 may be defined as an internal cavity in the partition wall in body 128. Body opening 160 generally extends radially in body 128. However, some angling, and perhaps curving, of body opening 160 relative to a radial extent of body 128 is possible. Body opening 160 has an inner surface 162.

Figure 8:
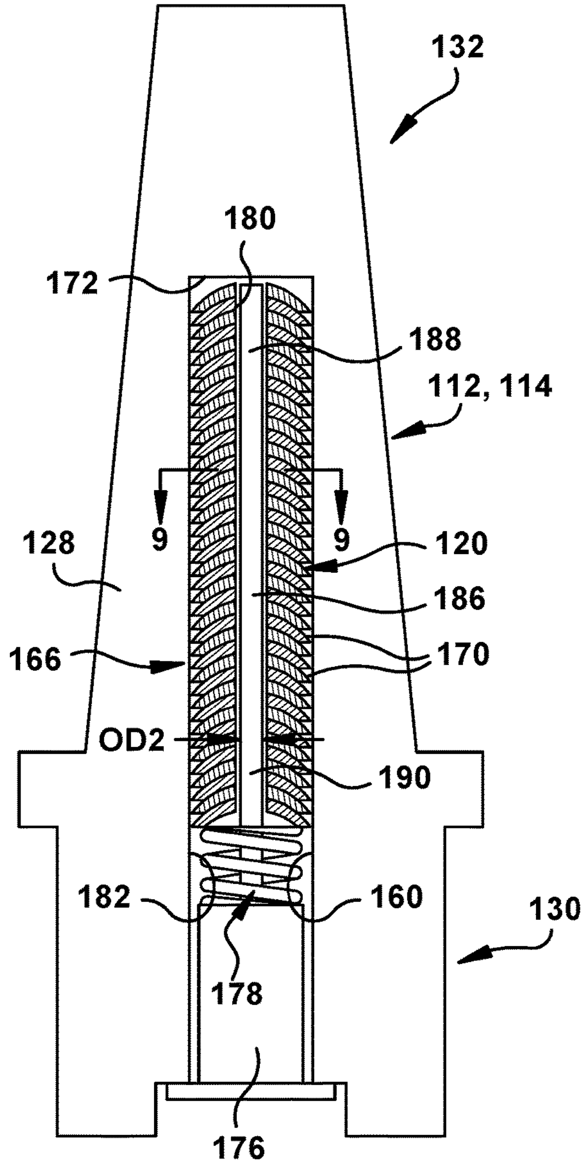
FIG. 8 shows a schematic cross-sectional view of a turbine nozzle or blade having a vibration damping system including a vibration damping element including a plurality of stacked plate members, according to other embodiments of the disclosure.
Figure 11:
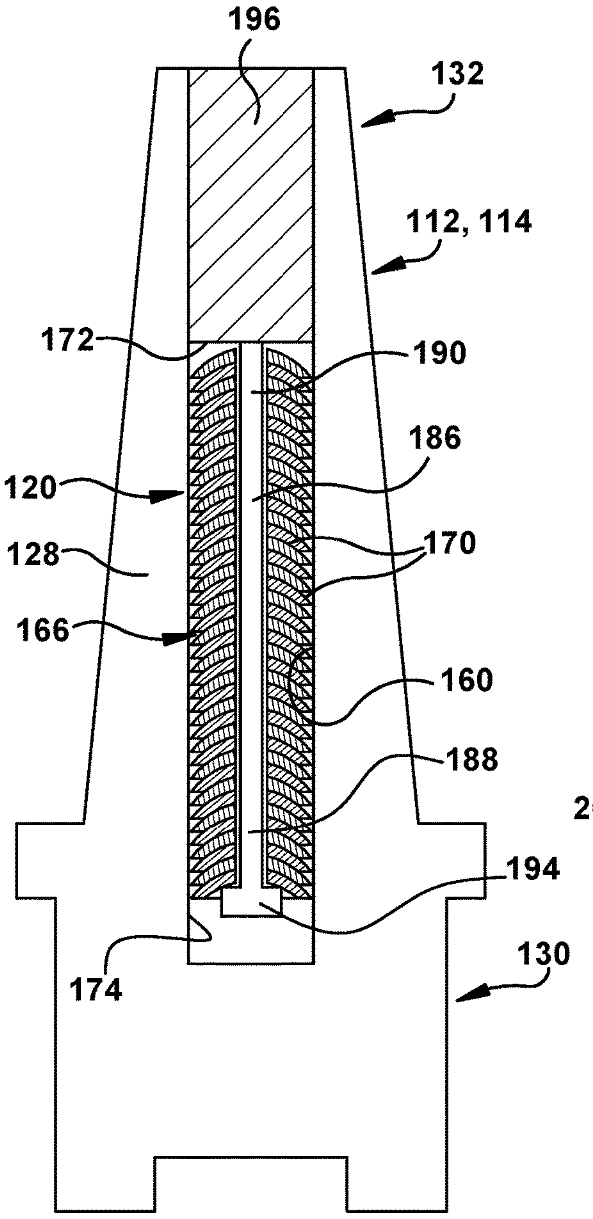
FIG. 11 shows a schematic cross-sectional view of a turbine nozzle or blade having a vibration damping system including a vibration damping element including a plurality of stacked plate members, according to additional embodiments of the disclosure.

As shown for example in FIGS. 5 and 8, body opening 160 may be open in base end 130 and terminate in tip end 132, or, as shown in FIG. 11, it may be open in tip end 132 and extend into base end 130. The open end may assist in assembling vibration damping system 120 in nozzle 112 or blade 114 and may allow retrofitting of the system into an existing nozzle or blade. Where body opening 160 extends through base end 130 as shown in FIG. 5, a closure or fixture member 176 for closing body opening 160 may be provided. Where body opening 160 extends through tip end 132, as shown in FIG. 11, a closure or fixing member 196 for body opening 160 may be provided. Closure or fixing members 176, 196 may also be employed to close body opening 160. Alternatively, as will be described, closure or fixing members 176, 196 may close body opening 160 and mount an elongated body 186 (or hollow elongated body 220 in FIG. 17) in an operational state within body opening 160.

Figure 6:
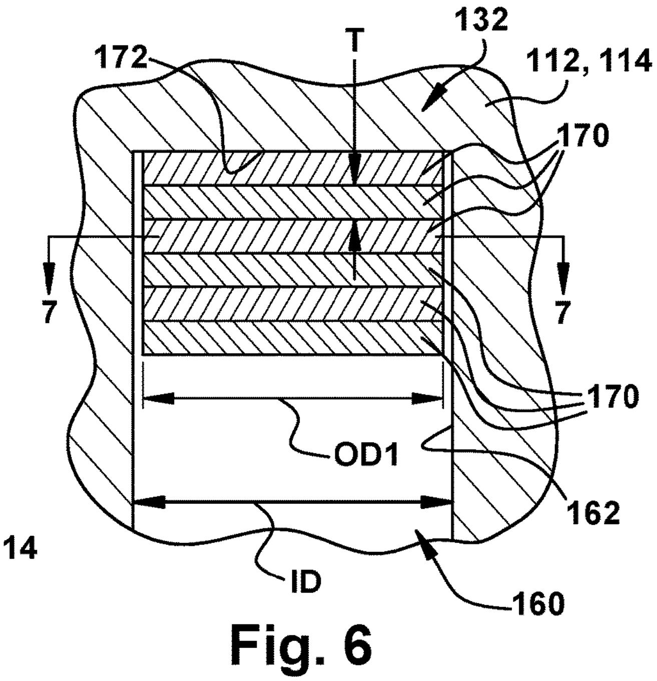
FIG. 6 shows an enlarged cross-sectional view of a plurality of stacked plate members that are planar, according to other embodiments of the disclosure.

Vibration damping system 120 for nozzles 112 or blades 114 may include a vibration damping element 166 disposed in body opening 160. Vibration damping element 166 may include a plurality of stacked plate members 170 within body opening 160 in turbine nozzle 114 or blade 114. FIG. 6 shows an enlarged cross-sectional view of a stack of plate members 170 in body opening 160. As shown in FIGS. 5 and 6, each plate member 170 is in surface contact with at least one adjacent plate member 170. Any number of plate members 170 may be stacked in body opening 160, e.g., 50, 100, 500, 1000. The surface contact dampens vibration as plate members 170 rub together during motion of nozzle 112 or blade 114.

In addition, body opening 160 has inner surface 162 having an inner dimension ID and each plate member 170 has an outer dimension OD1 sized to frictionally engage inner dimension ID of body opening 160 to damp vibration during motion of nozzle 112 or blade 114. That is, the outer dimension OD1 of each plate member 170 rubs against inner surface 162 of body opening 160 to dampen vibration, e.g., during movement of airfoil 134 of nozzle 112 or blade 114. In one non-limiting example, a difference between outer dimension OD1 of plate members 170 and inner dimension ID of inner surface 162 of body opening 160 may be in a range of approximately 0.04-0.06 millimeters (mm), which allows insertion of plate members 170 but frictional engagement during use and relative movement of airfoil 134 of nozzle 112 or blade 114.

Figure 7:
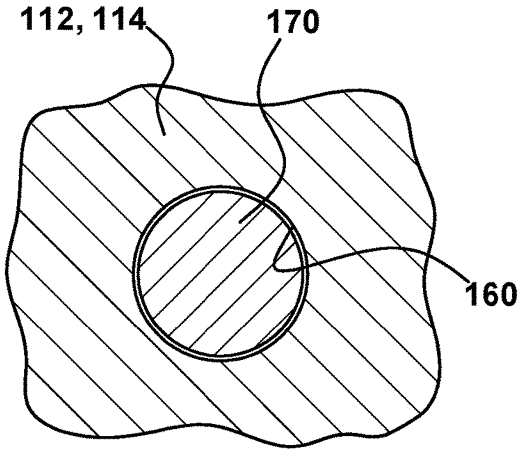
FIG. 7 shows a cross-sectional view of a vibration damping element along view line 7-7 in FIG. 6, according to additional embodiments of the disclosure.

Plate members 170 can take a variety of forms. In FIG. 5, each plate member is a solid plate member but is cupped. That is, each plate member 170 has a concave surface on one side and a convex surface on the other side thereof, allowing the plate members 170 to stack in a cupping manner. FIG. 6 shows another embodiment in which each plate member 170 is planar. The outer shape of each plate member 170 generally matches that of body opening 160. In one example, shown in the cross-sectional view of FIG. 7 (see view line 7-7 in FIG. 6), body opening 160 and plate members 170 may have circular cross-sectional shapes. However, other shapes are also possible such as but not limited to oval or otherwise oblong; or polygonal such as square, rectangular, pentagonal; etc.

Each plate member 170 may have any thickness sufficient to provide the desired vibration damping movement. In one non-limiting example, each plate member 170 may have a thickness T (FIG. 6) of between approximately 0.76-2.54 millimeters (mm). Thickness T of each plate member 170 is less than or equal to 10% a width thereof. Plate members 170 may be made of any material having the desired vibration resistance required for a particular application, e.g., a metal or metal alloy. In some embodiments, plate members 170 may need to be very rigid or stiff, which could require alternative stiffer materials than metal or metal alloy such as, but not limited to, ceramic matrix composites (CMC). Plate members 170 may also be coated in various coating materials to alter frictional properties thereof. Outer edge surfaces of plate members 170 may be configured to be parallel and in close proximity with inner surface 162 of body opening 160.

Stack of plate members 170 may be retained in body opening 160 in any manner. As shown in FIGS. 5 and 6, stack of plate members 170 may abut an end 172 of body opening 160 to retain the stack. Where body opening 160 extends through body 128, end 172 of body opening 160 in tip end 132 may include a closure or fixing member (not shown in FIG. 6, similar to closure member 176 shown for base end 130 in FIG. 5), e.g., a plug or other mechanism closing body opening 160. In any event, as understood, centrifugal force on blade 114 will force stack of plate members 170 against end 172 in tip end 132 of body 128 of turbine blade 114 as the blade rotates. Similarly, the weight of stack of plate members 170 will force them against end 172 of body opening 160 in tip end 132 in stationary nozzle 114. In the latter case, as shown in FIG. 8, a spring or other force system 178 can also be used to hold plate members 170 in place for stationary components, such as nozzles 112. An opposing end 174 in base end 130 of body opening 160 may be closed by any now known or later developed closure or fixing member 176, as shown in FIG. 5. Closure or fixing members 176 (and 196) described herein can be fastened using any now known or later developed mechanisms including but not limited to: welding, fasteners, and male-female connectors.

Figure 9:
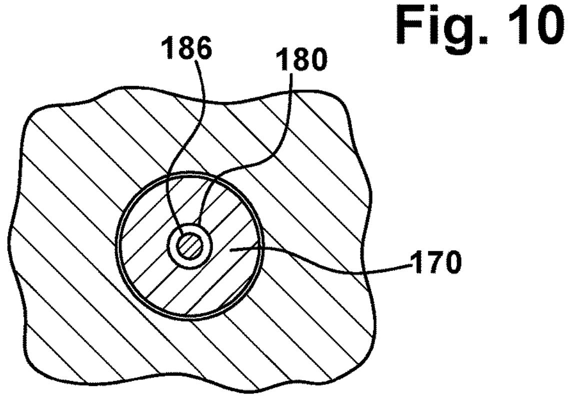
FIG. 9 shows an enlarged cross-sectional view of a plate member and an elongated body along view line 9-9 in FIG. 8, according to embodiments of the disclosure.

FIG. 8 shows a schematic cross-sectional view of nozzle 112 or blade 114 including vibration damping system 120 according to other embodiments of the disclosure. In this embodiment, as shown in FIG. 8 and the top-down view of FIG. 9, each plate member 170 in stack of plate members 170 includes a central opening 180. Vibration damping element 166 may include an elongated body 186 extending within and fixed relative to body opening 160. Elongated body 186 extends through central opening 180 in each plate member 170 of plurality of stacked members 170. Central opening 180 and elongated body 186 are sized and shaped such that plate members 170 slide freely on elongated body 186. Hence, each of plurality of stacked plate members 170 can be planar or cupped and slide freely on elongated body 186.

Elongated body 186 includes a first, free end 188 and a second end 190 fixed relative to base end 130 or tip end 132 (base end 130 in FIG. 8). Body opening 160 has inner dimension ID (FIG. 6) greater than a corresponding outer dimension OD2 (FIG. 8) of elongated body 186, allowing elongated body 186 a limited movement range within body opening 160 to dampen vibrations through deflection thereof within body opening 160. Elongated body 186 may damp vibration by deflection thereof in body opening 160 as it extends radially between tip end 132 and base end 130 of body 128 of turbine nozzle 112 or blade 114.

Elongated body 186 may have any length desired to provide a desired deflection and vibration damping within nozzle 112 or blade 114 and, as will be described, to position any number of plate members 170. Elongated body 186 may have any desired cross-sectional shape to provide free sliding of plate members 170 thereon. For example, elongated body 186 and central openings 180 may have a circular or oval cross-sectional shape, i.e., they are cylindrical or rod shaped (see e.g., FIG. 9). However, other cross-sectional shapes are also possible. Elongated body 186 may be made of any material having the desired vibration resistance required for a particular application, e.g., a metal or metal alloy. In some embodiments, elongated body 186 may need to be very rigid or stiff, which could require alternative stiffer materials than metal or metal alloy such as, but not limited to, ceramic matrix composites (CMC). In the FIG. 8 embodiment, elongated body 186 may be a solid member, e.g., a solid rod.

Figure 10:
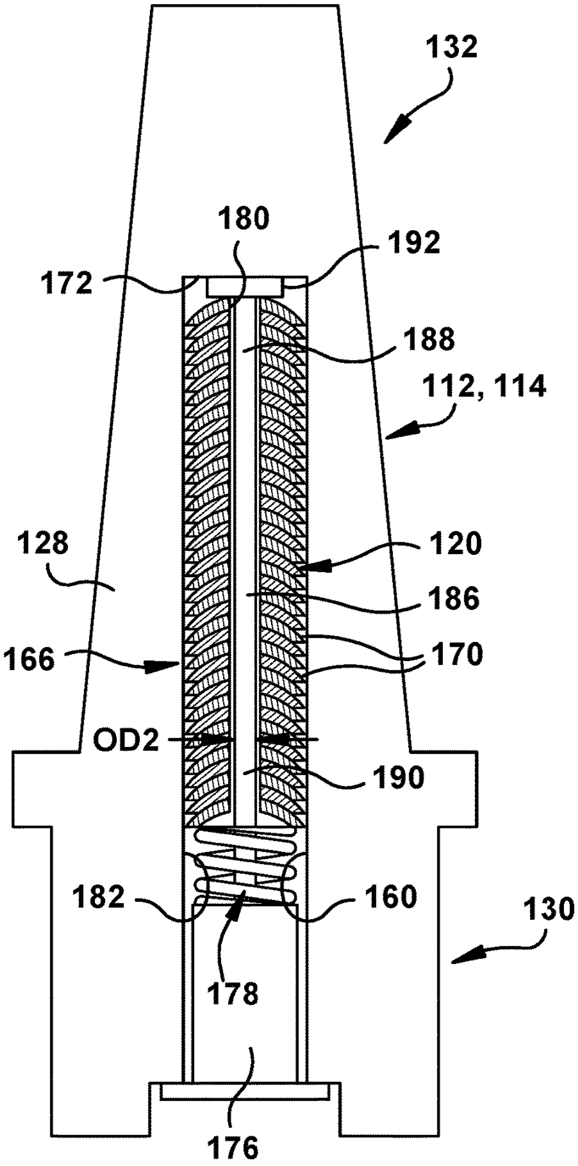
FIG. 10 shows a schematic cross-sectional view, similar to FIG. 8, but including a retainer on an elongated body of a vibration damping element, according to other embodiments of the disclosure.

FIG. 10 shows a schematic cross-sectional view of nozzle 112 or blade 114 including vibration damping system 120 according to additional embodiments of the disclosure. In FIGS. 8 and 10, second end 190 of elongated body 186 is fixed relative to base end 130 of body 128 of turbine nozzle 112 or blade 114, and first, free end 188 extends towards tip end 132. In FIGS. 6 and 8, plurality of plate members 180 are retained in body opening by abutting inner end 172 of body opening 160. FIG. 10 shows an embodiment in which a retention member 192 is disposed at end 188 of elongated body 186 to prevent plurality of stacked plate members 170 from moving relative to a length of elongated body 186. Here, plate members 170 abut retention member 192 rather than end 172 of body opening 160. Retention member 192 can have any shape or size to prevent plate members 170 from sliding off elongated body 186.

FIG. 11 shows a schematic cross-sectional view of nozzle 112 or blade 114 including vibration damping system 120 according to other embodiments of the disclosure. In FIG. 11, second end 190 of elongated body 186 is fixed relative to tip end 132 of body 128, and first, free end 188 extends towards base end 130. Here, a retention member 194 on elongated body 186 prevents the plurality of stacked plate members 170 from moving relative to a length of the elongated body 186. Retention member 194 can have any shape or size to prevent plate members 170 from sliding off elongated body 186. In any event, as understood, centrifugal force on blade 114 will force stack of plate members 170 against end 172 in tip end 132 of body 128 of turbine blade 114 as the blade rotates. Similarly, the weight of stack of plate members 170, perhaps with the assistance from a spring or other force system 178 (FIG. 8), will force them against retention member 194 on elongated body 186 in base end 130 in stationary nozzle 114 during use. End 172 in tip end 132 of body opening 160 may be closed by any now known or later developed closure or fixing member 196.

In FIGS. 8, 10 and 11, second end 190 may be fixed in any now known or later developed manner. In one example, shown in FIG. 11, where used in turbine blade 114, second end 190 can be fixed by radial loading during operation of turbine 108 (FIGS. 1-2), i.e., by centrifugal force. In another example, second end 190 may be physically fixed, e.g., by fastening using couplers, fasteners, and/or welding. For example, elongated body 186 may include second end 190 that may be physically fixed in tip end 130 or base end 132 by threaded fasteners.

Figure 12:
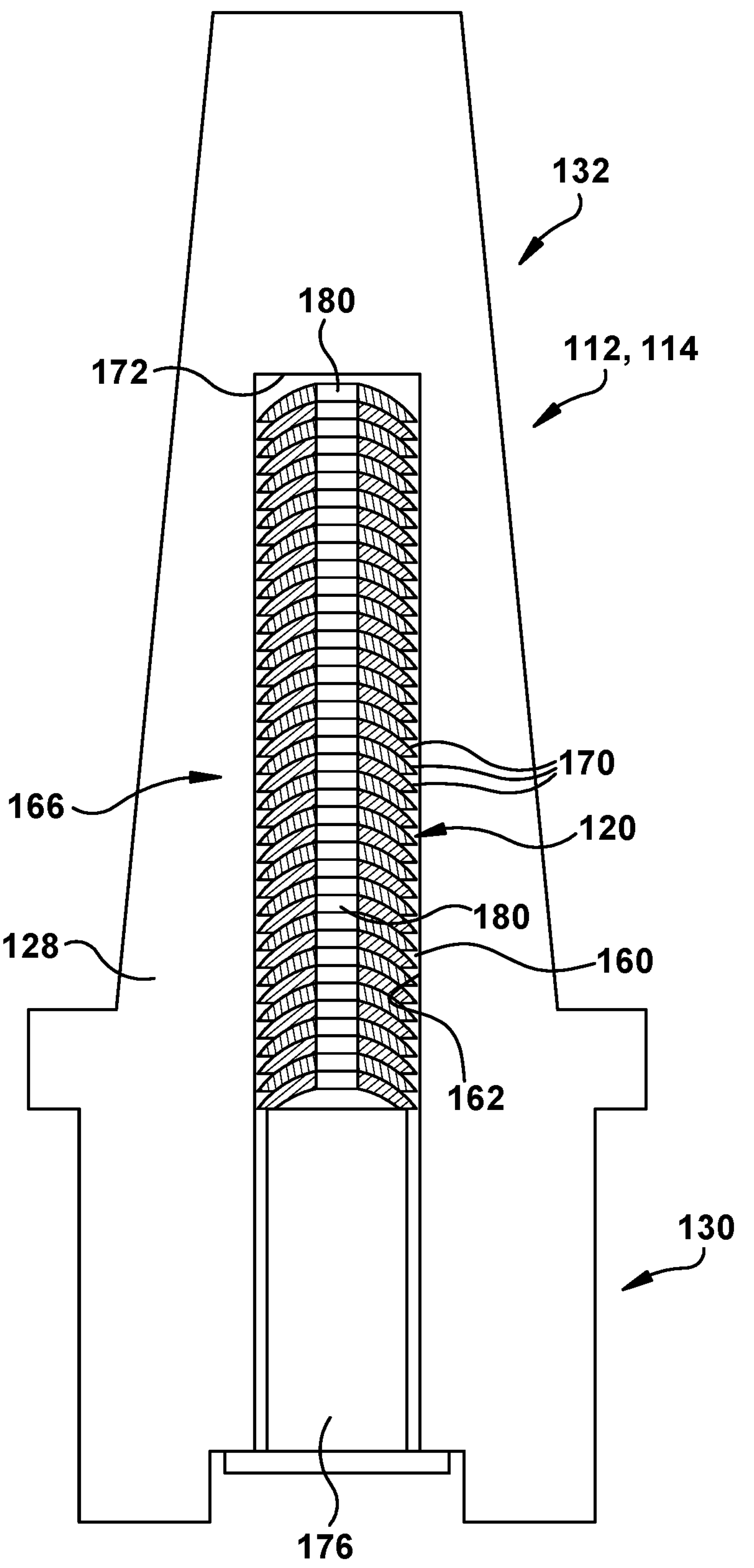
FIG. 12 shows a schematic cross-sectional view of a turbine nozzle or blade having a vibration damping system including a vibration damping element including a plurality of stacked plate members, according to other embodiments of the disclosure.

FIG. 12 shows a schematic cross-sectional view of nozzle 112 or blade 114 including vibration damping system 120 according to other embodiments of the disclosure. FIG. 12 is substantially similar to FIG. 5 except each plate member 170 in the plurality of stacked plate members 170 includes central opening 180 therein. Unlike FIGS. 8, 10, and 11, elongated body 186 is omitted.

Figure 13:
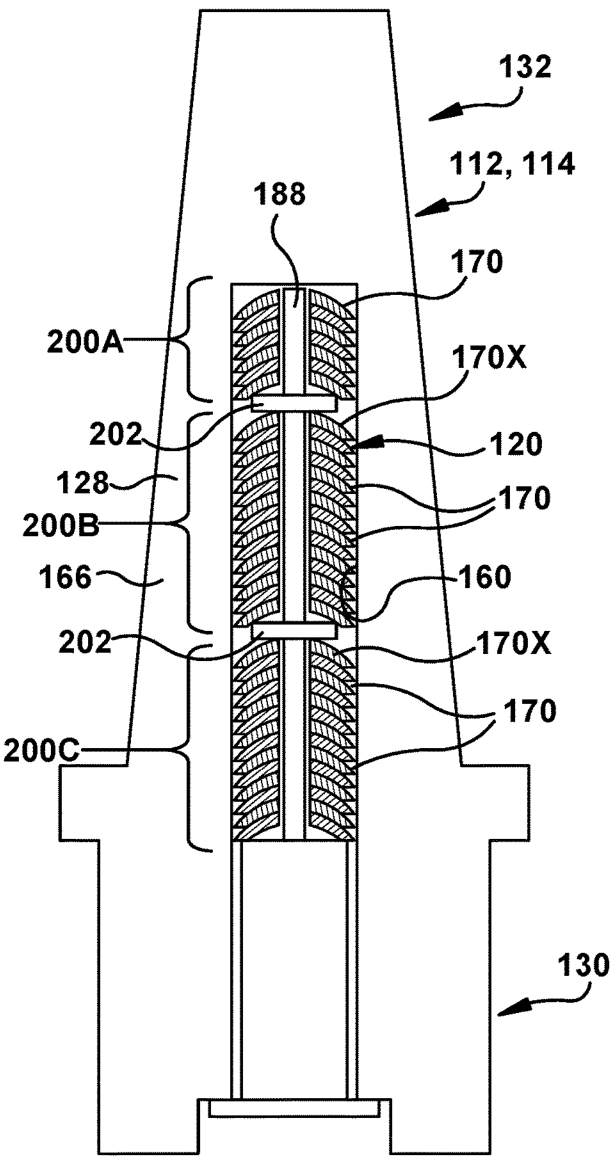
FIG. 13 shows a schematic cross-sectional view of a turbine nozzle or blade having a vibration damping system including a vibration damping element including grouped, stacked plate members, according to additional embodiments of the disclosure.

Plurality of stacked plate member(s) 170 may be retained in position or limited in movement using a number of ways. As noted previously, retention members 192 (FIG. 10), 194 (FIG. 11) on elongated body 186 may be used to restrain plate members 170. Hence, in accordance with embodiments of the disclosure, retention member 192, 194 on elongated body 186 may be used to retain plate members 170 relative to a length of elongated body 186 in an operative state in body opening 160 of turbine nozzle 112 or blade 114. FIG. 13 shows a cross-sectional view of another embodiment in which plurality of stacked plate members 170 are separated into at least two groups 200. In FIG. 13, three groups 200A-C are shown, but any number of groups can be used. A retention member 202 on elongated body 186 engages with an endmost plate member 170X of each group 200A-C to prevent the respective group from moving relative to a length of elongated body 186. End 172 of body opening 160 may retain group 200A closest to tip end 132, or another retainer 202 (not shown) can be used. Any number of groups 200 with each group including any number of plate members 170 can be used to provide the desired vibration dampening.

Installing plurality of stacked plate members 170 into body opening 160 can be carried out in a number of ways to ensure plate members 170 are positioned in a stacked manner during use. In one embodiment, plate members 170 can be carefully positioned in body opening 160 in a stacked manner, e.g., one-by-one and/or in groups. In another embodiment, plate members 170 are positioned on elongated body 186, and elongated body 186 is positioned in and fixed relative to body opening 160. In this approach, as shown in FIGS. 8, 10, 11 and 13, elongated body 186 remains in body opening 160, i.e., it is part of vibration damping system 120.

Figure 14:
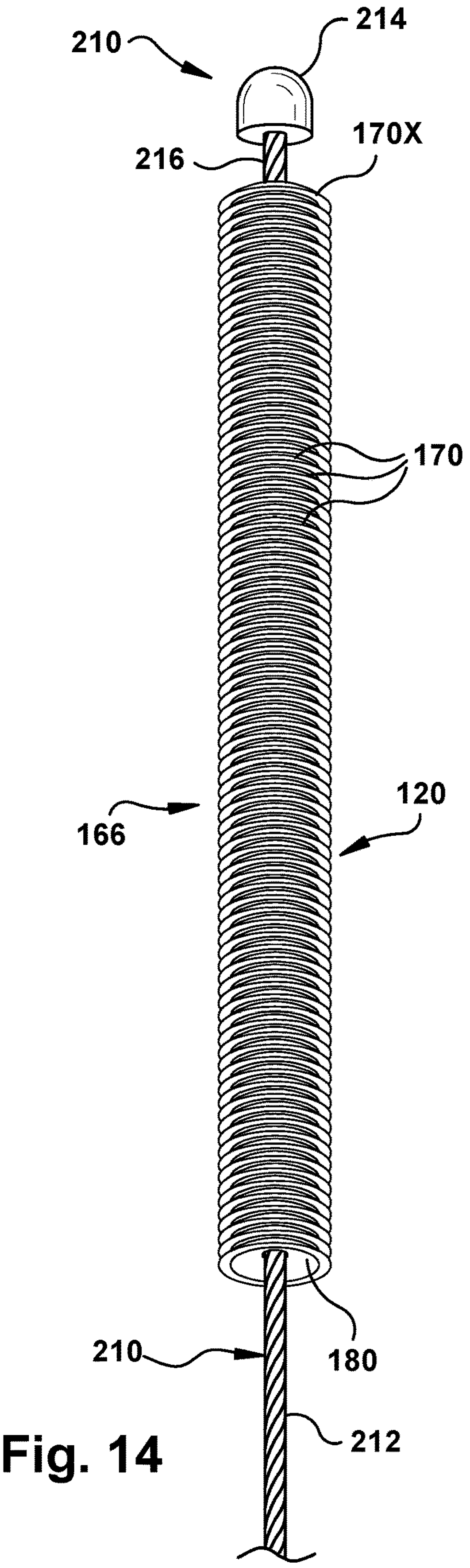
FIG. 14 shows a side view of a positioning system for a vibration damping system including a vibration damping element, according to embodiments of the disclosure.
Figure 15:
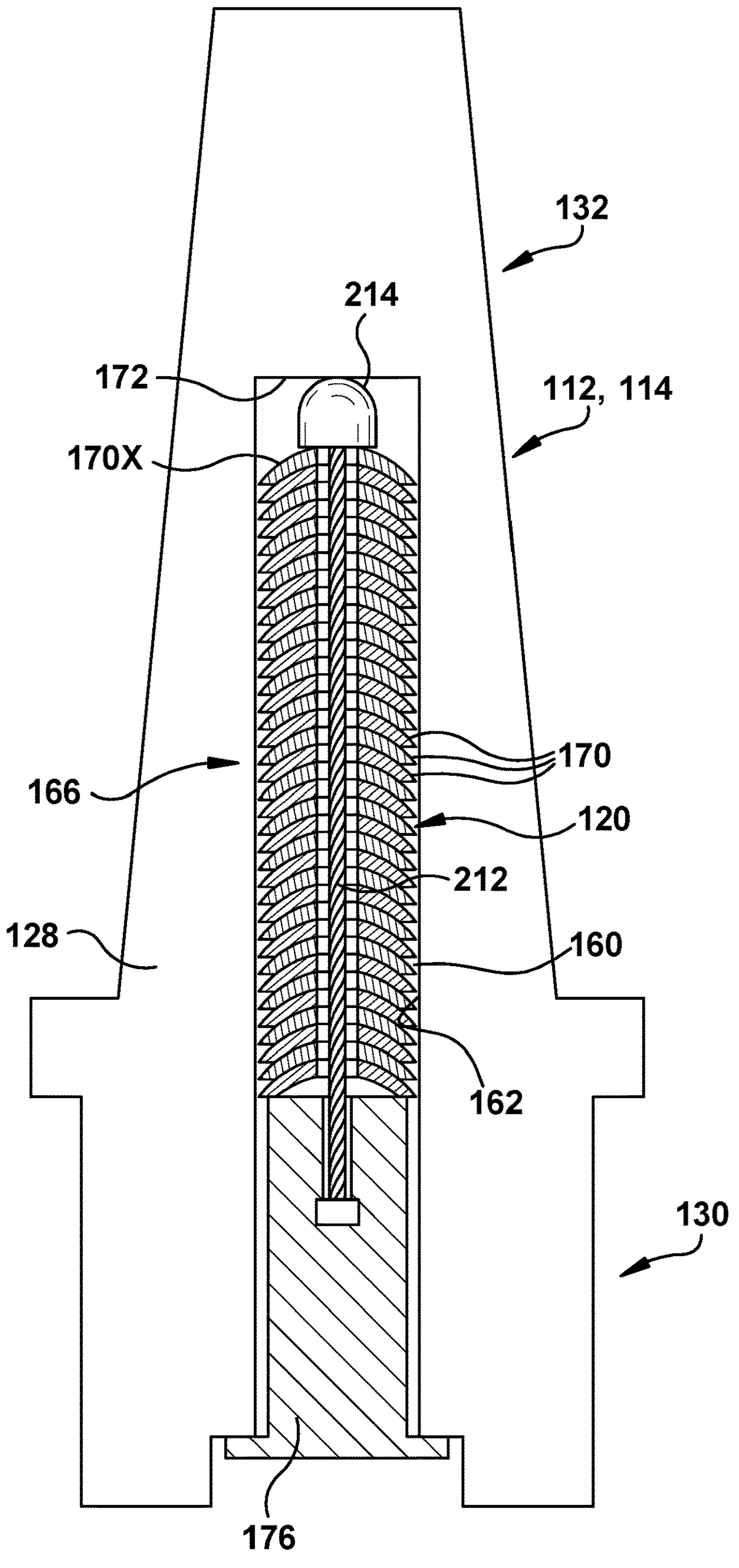
FIG. 15 shows a schematic cross-sectional view of a turbine nozzle or blade having a vibration damping system including a vibration damping element with the positioning system of FIG. 14, according to embodiments of the disclosure.

In another embodiment, a positioning system 210 can be used to install plurality of stacked plate members 170. FIGS. 14-15 show embodiments of a method of installing vibration damping element 166 in body opening 160 in turbine nozzle 112 or blade 114 using positioning system 210. FIG. 14 shows a side view of a positioning system 210 including a cable 212 for aligning and/or inserting plurality of stack plate members 170 in body opening 160 of turbine nozzle 112 or blade 114; and FIG. 15 shows a cross-sectional view of nozzle 112 or blade 114 having positioning system 210 of FIG. 14 therein.

A method of installing vibration damping element 166 in body opening 160 in turbine nozzle 112 or blade 114 may include, as shown in FIG. 14, positioning cable 212 through central opening 180 in each of plurality of stacked plate members 170. In this embodiment, plate members 170 each include central opening 180 through which cable 212 extends. Plate members 170 may be placed on cable 212 in any manner to form the stack, e.g., one-by-one and/or in groups. A retainer 214 engages with endmost plate member 170X to retain the stack of plate members 170 on cable 212. Retainer 214 can be any structure capable of connection to end 216 of cable 212 and large enough to prevent plate members 214 from sliding off cable 212. In FIG. 14, plate members 170 are cupped, but they could alternatively be planar. Cable 212 can be any flexible elongated element capable of being strung through plate members 170 and having sufficient strength to withstand the installation of vibration damping element 166 and the environment of turbine nozzle 112 or blade 114 during operation. In one example, cable 212 can be a metal or metal alloy rope, woven or single strand.

FIG. 15 shows the positioning of plurality of stacked plate members 170 with cable 212 therein into body opening 160 of turbine nozzle 112 or blade 114. In one example, the positioning may include hanging stacked plate members 170 vertically using cable 212 and dropping the stacked plate members 170 into body opening 160 until retainer 214 reaches end 172 of body opening 160. Cable 212 may be fastened to a closure or fixing member 176, as described herein, or may be left in a loose configuration. In any event, plate members 170 are positioned in a stacked manner in body opening 160 for use as part of vibration damping element 166 in vibration damping system 120. When using this method of installation, vibration damping element 166 of vibration damping system 120 includes the plurality of stacked plate members 170, cable 212 extending through the plurality of stacked plate members 170, and retainer 214 coupled to end 216 of cable 212. Retainer 214 engages with endmost plate 170X of the plurality of stacked plate members 170 to retain the plurality of stacked plate members 170 on cable 212, i.e., at least during the installation and perhaps during use.

Figure 16:
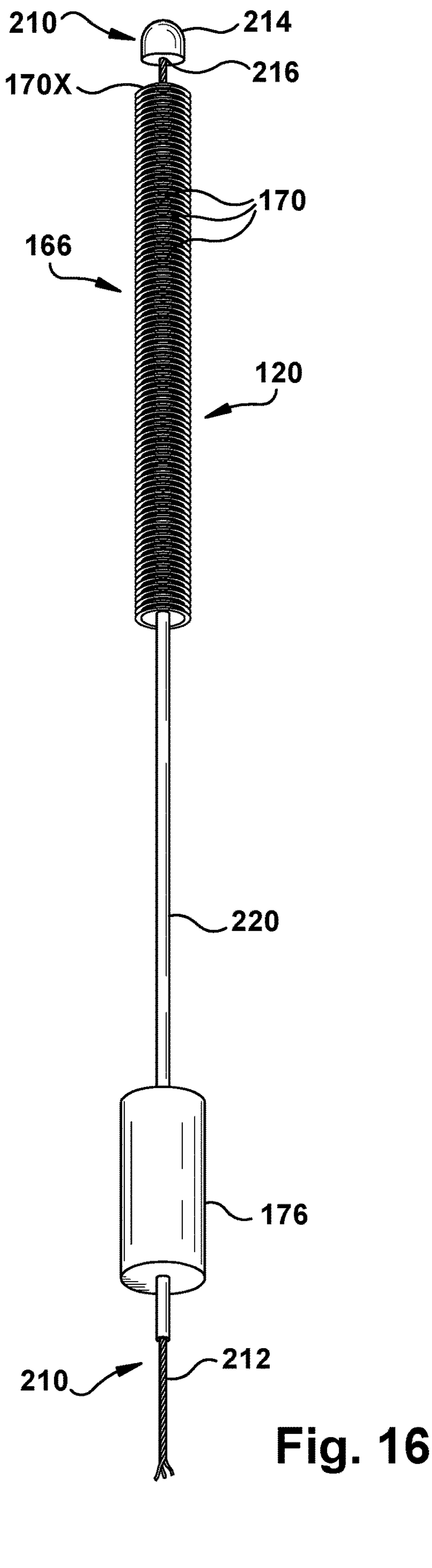
FIG. 16 shows a side view of a positioning system for a vibration damping system including a vibration damping element, according to other embodiments of the disclosure.
Figure 17:
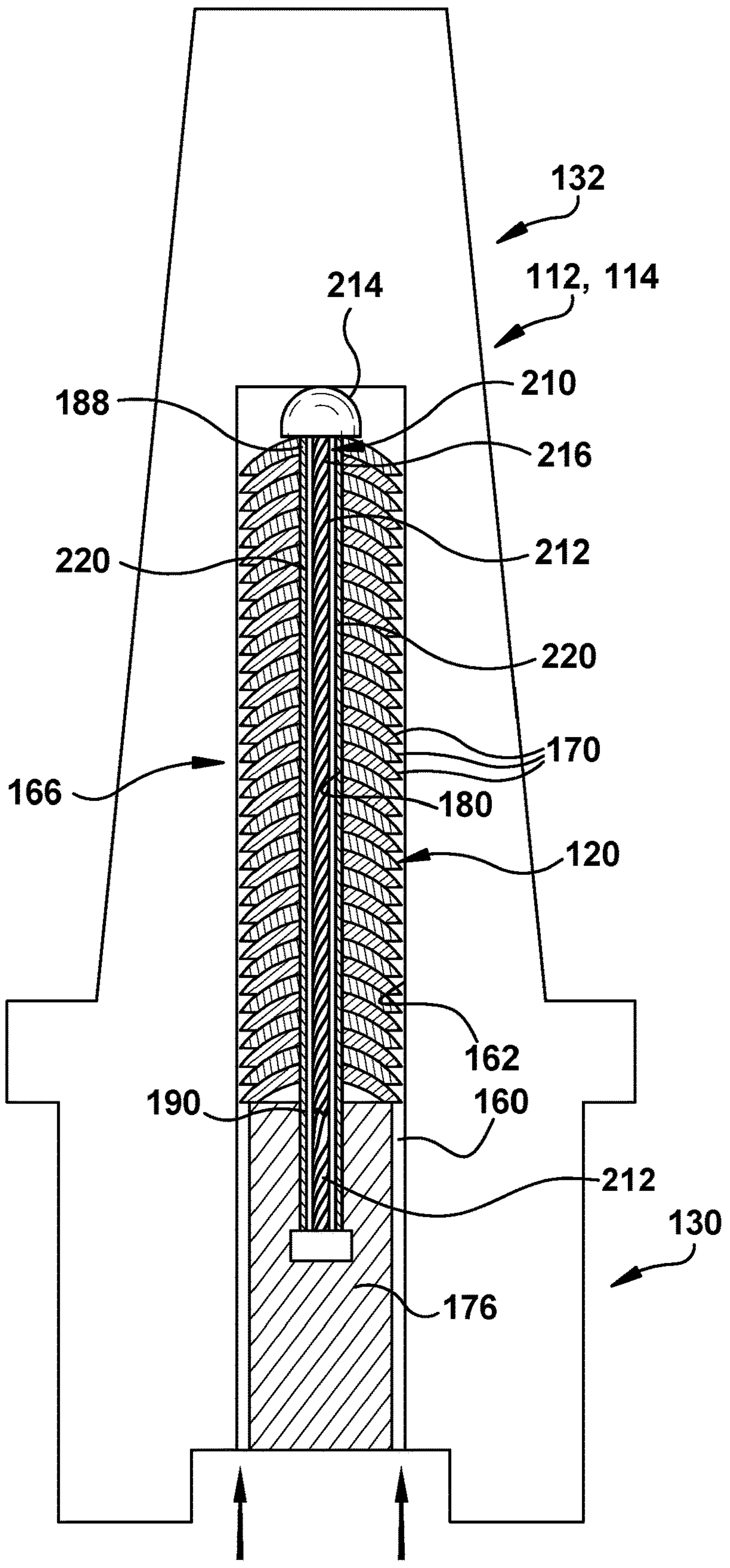
FIG. 17 shows a schematic cross-sectional view of a turbine nozzle or blade having a vibration damping system including a vibration damping element with the positioning system of FIG. 16, according to other embodiments of the disclosure.

FIGS. 16-17 show an alternative embodiment of a method of installing vibration damping element 166 in body opening 160 in turbine nozzle 112 or blade 114. FIG. 16 shows a side view of positioning system 210 including a hollow elongated body 220 over cable 212 and within plurality of stack plate members 170. FIG. 17 shows a cross-sectional view of nozzle 112 or blade 114 having positioning system 210 therein including hollow elongated body 220. Hollow elongated body 220 is hollow along a length thereof, i.e., it is tubular. Elongated body 220 is otherwise identical to elongated body 186 described herein.

As shown in FIG. 16, this embodiment further includes positioning cable 212 through central opening 180 of plurality of stacked plate members 170 and positioning a hollow elongated body 220 over cable 212 and through central opening 180 (FIG. 9) of each of the plurality of stacked plate members 170. These steps may occur in any order. For example, they may occur sequentially: a) plate members 170 onto cable 212 then hollow elongated body 220 insertion into plate members 170 over cable 212, orb) plate members 170 onto hollow elongated body 220 then cable 212 through hollow elongated body 220. Alternatively, the steps may occur simultaneously: cable 212 may be fed through hollow elongated body 220 and plate members 170 positioned over both hollow elongated body 220 and cable 212 therein.

FIG. 17 shows the positioning of plurality of stacked plate members 170 into body opening 160, which includes using hollow elongated body 212 to insert the plurality of stacked plate members 170. That is, positioning the plurality of stacked plate members 170 includes using both hollow elongated body 220 and cable 212. Hollow elongated body 220 may assist in maintaining stack plate members 170 in a more aligned manner than just using cable 212 and may allow for a certain amount of force to be applied during the insertion of the plate members 170 into body opening of turbine nozzle 112 or blade 114. As shown in FIGS. 16 and 17, a closure or fixing member 176 may be coupled to hollow elongated body 220 for permanently mounting vibration damping element 166 with hollow elongated body 220 and cable 212 in the plurality of stacked plate members 170.

When using this method of installation, vibration damping element 166 of vibration damping system 120 includes: stacked damping plate members 170, elongated body 220 that is hollow along a length thereof, cable 212 that extends through the plurality of stacked plate members 170, and retainer 214 that is coupled to end 216 of cable 212. Again, retainer 214 engages with endmost plate 170X of the plurality of stacked plate members 170 to retain the plurality of stacked plate members 170 on cable 212, i.e., at least during the installation and perhaps during use. Elongated hollow body 220 may also engage against retainer 214, but this may not be necessary in all cases. In any event, elongated hollow body 220 functions the same as elongated body 186.

Referring again to FIG. 15, in an alternative embodiment of the method, once the plurality of stacked plate members 170 are installed in body opening 160 of turbine nozzle 112 or blade 114 using elongated hollow member 220 per FIG. 17, hollow elongated body 220 may be removed from within the plurality of stacked plate members 170, leaving them in body opening 160 with cable 212. This process can take any form. In one example, the plurality of stacked plate members 170 may be held in body opening 160 (e.g., with an elongated element (not shown) capable of positioning between plate members 170 and inner surface 162 of body opening against an endmost plate member 170X), and hollow elongated body 220 may be slid out of central opening 180 of the plurality of stacked plate members 170 and out of body opening 160. As shown in FIG. 15, cable 212 remains in body opening 160.

Figure 19:
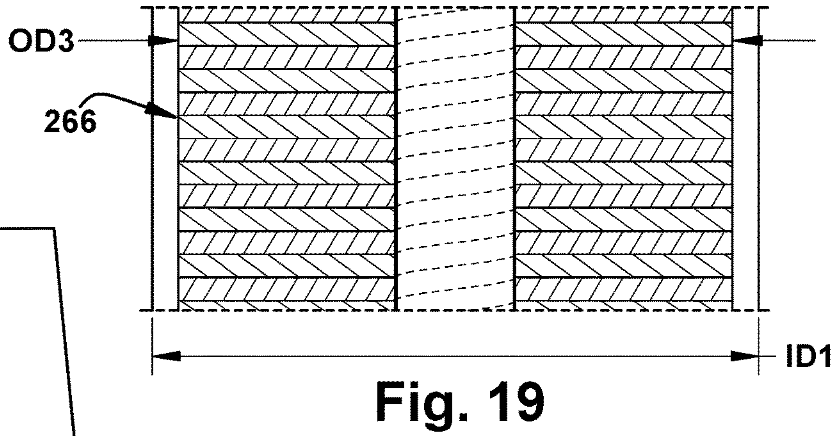
FIG. 19 shows an enlarged, schematic cross-sectional view of the vibration damping element of FIG. 18 including the helical metal ribbon spring, according to other embodiments of the disclosure.
Figure 18:
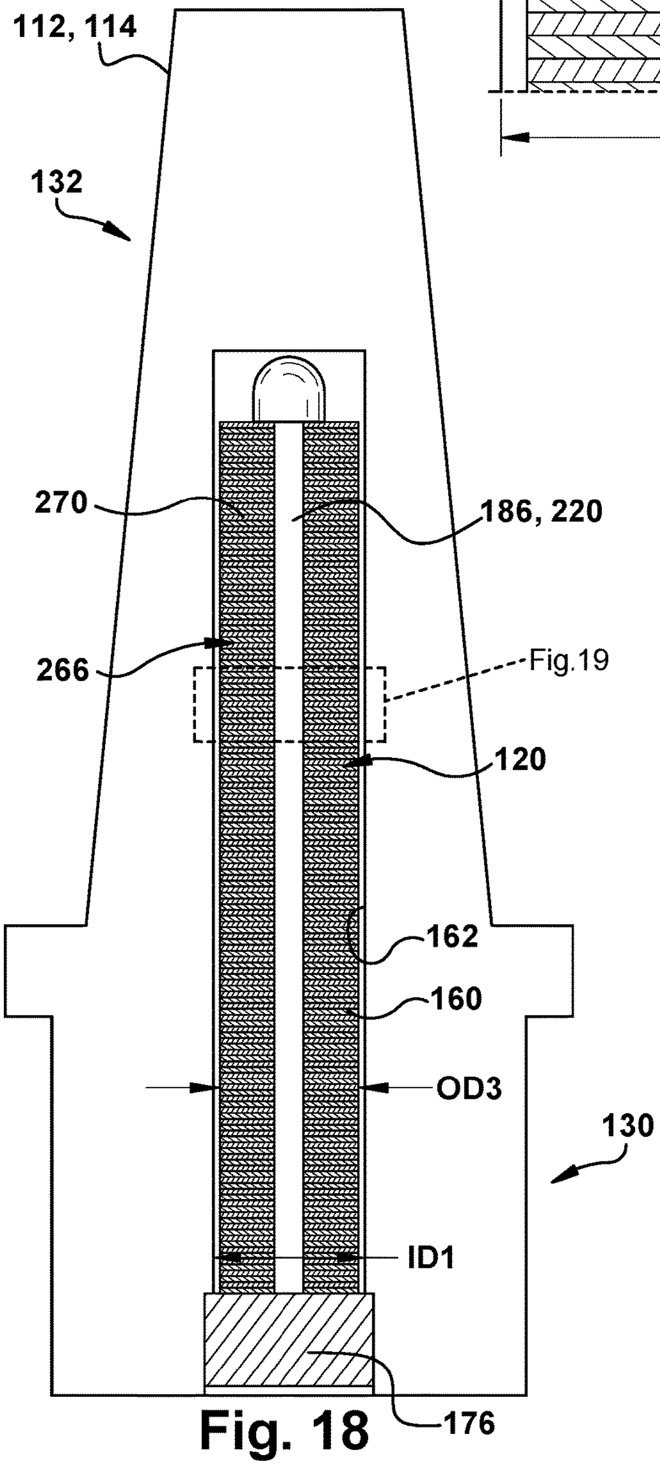
FIG. 18 shows a schematic cross-sectional view of a turbine nozzle or blade having a vibration damping system including a vibration damping element including a helical metal ribbon spring, according to other embodiments of the disclosure.

FIG. 18 shows a cross-sectional view of a vibration damping element 266 of a vibration damping system 120 for turbine nozzle 112 or blade 114, according to another embodiment of the disclosure. FIG. 19 shows an enlarged, schematic cross-sectional view of the vibration damping element of FIG. 18. In this embodiment, vibration damping element 266 includes a helical metal ribbon spring 270 within body opening 160 in turbine nozzle 112 or blade 114. Body opening 160 has an inner surface 162 having inner dimension ID, and helical metal ribbon spring 270 has an outer dimension OD3 sized to frictionally engage inner surface 162 of body opening 160 to damp vibration during motion of nozzle 112 or blade 114. Helical spring 270 may be made of any appropriate spring metal providing the desired vibration damping and frictional surface engagement between adjacent coils. The coils of helical spring 270 may have any desired width and/or shape and may be coated as described herein relative to plate members 170, to customize the frictional interaction between contacting coils of helical spring 270. Outer edge surfaces of coils of helical metal ribbon spring 270 may be configured to be parallel with inner surface 162 of body opening 160. Optionally, helical metal ribbon spring 270 can be fixed at one or both ends thereof in any manner.

An elongated body 186 or hollow elongated body 220, as described herein, may be optionally provided through helical metal ribbon spring 270.

The methods have been described relative to embodiments in which base end 132 of body 128 of turbine nozzle 112 or blade 114 presents the access to body opening 160, and is the end at which elongated body 186, 220 is fixed relative to body 128 of turbine nozzle 112 or blade 114. It will be recognized that the teachings of the disclosure relative to the method can be applied to those embodiments in which access is provided via tip end 130 and/or where tip end 130 is where elongated body 186, 220 is fixed relative to body 128 of turbine nozzle 112 or blade 114.

During operation of turbine nozzle 112 or blade 114, vibration damping element 166 of vibration damping system 120 operates with tip end 132, i.e., of airfoil 134, driving relative motion with base end 130 of nozzle 112 or blade 114. Here, vibration damping system 120 allows vibration damping via the relative motion through the deflection of tip end 132 and frictional engagement of plurality of stacked plate members 170 with each other and/or inner surface 162 of body opening 160. Where provided, contacting surfaces of helical metal ribbon spring 270 provide similar frictional engagement to dampen vibrations. In the FIGS. 8, 10, 13, 17 and 18 embodiments, vibration damping system 120 operates with free end 188 of elongated body 186, 220 moving with tip end 132, i.e., with airfoil 134, driving relative motion with base end 130 of nozzle 112 or blade 114. Here, vibration damping system 120 also allows vibration damping through deflection of elongated body 186, 220 and frictional engagement of plurality of stacked plate members 170 with each other and/or inner surface 162 of body opening 160. Alternatively, where provided, helical metal ribbon spring 270 provides similar frictional engagement as stacked plate members 170.

The vibration damping can be customized in a number of ways including, but not limited to, the size, number, shape, coating(s), thickness(es), and material(s) of plate members 170, the grouping of stacked plate members 170 (FIG. 13), or the presence and form of elongated body 186 or hollow elongated body 220 (e.g., stiffness, tightness with plate members 170 and/or length). Similarly, where helical metal ribbon spring 270 is used, the vibration damping can be customized in a number of ways including, but not limited to, the size and shape of the metal ribbon, number of coils, coating(s), thickness(es) of coils, material, or the presence and form of elongated body 186 or hollow elongated body 220 (e.g., stiffness, tightness with helical spring 270 and/or length).

Body opening 160 may terminate in base end 130 or tip end 132, or it may extend through base end 130 or tip end 132. Any form of closure or fixing member 176, 196 may be provided to close body opening 260 and/or close body opening 160 and fixedly couple second end 190 of elongated body 186 (220 in FIG. 17) relative to base end 130. Closure and fixing members 176, 196 may include any now known or later developed structure to fixedly couple elongated body 186 (220 in FIG. 17) relative to base end 130 or tip end 132 in body opening 160, e.g., a plate with a fastener or weld for elongated body 186, 220.

According to various embodiments, a method of damping vibration in turbine nozzle 112 or blade 114 during operation of turbine nozzle 112 or blade 114 may include providing various levels of different vibration damping. For example, a method may dampen vibration by deflection of elongated body 186, 220 disposed radially in body opening 160 and extending between tip end 132 and base end 130 of body 128 of turbine nozzle 112 or blade 114. As noted, elongated body 186, 220 may include first, free end 188 and second end 190 fixed relative to base end 130 or tip end 132 of body 128. The method may also damp vibration by frictional engagement of plurality of stacked plate members 170, perhaps surrounding elongated body 186, 220, with each other and/or with inner surface 162 of body opening 160.

Alternatively, the method may also damp vibration by frictional engagement of coils of helical metal ribbon spring 270, perhaps surrounding elongated body 186, 220, with each other and/or with inner surface 162 of body opening 160. The surface contact of stacked plate members 170 or helical metal ribbon spring 270 creates friction, thus dissipating the input energy from the vibration. The frictional forces may also restrict motion of elongated body 186, 220, thus reducing displacement. For rotating blades 114, damping of vibration by frictional engagement may be increased compared to nozzle 112 based on the centrifugal force increasing a force of frictional engagement of stacked plate members 170 or coils of helical spring 270 with each other and/or with inner surface 162 of body opening 160.

It will be apparent that some embodiments described herein are applicable mainly to rotating turbine blades 114 that experience centrifugal force during operation and thus that may require certain structure to maintain high performance vibration damping. That said, any of the above-described embodiments can be part of a turbine nozzle 112 or blade 114.

Embodiments of the disclosure provide vibration damping element(s) 166 including plurality of stacked plate members 170 or helical metal ribbon spring 270 to reduce nozzle 112 or blade 114 vibration with a simple arrangement. As noted, a variety of retention systems may be used to maintain a position of plate members 170 or groups of plate members 170. Vibration damping system 120 does not add much extra mass to nozzle(s) 112 or blade(s) 114, and so it does not add additional centrifugal force to blade tip end or require a change in nozzle or blade configuration. Moreover, the presence of vibration damping system 120 can reduce stresses on nozzle 112 or blade 114, thereby extending the useful life of such components.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," is not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described to best explain the principles of the disclosure and the practical application and to enable others of ordinary skill in the art to understand the disclosure for various embodiments with various modifications as are suited to the particular use contemplated.

What is claimed is:

1. A vibration damping element for a vibration damping system for a turbine nozzle or blade, the vibration damping element comprising:

a plurality of identical stacked plate members within a body opening in the turbine nozzle or blade, each plate member in surface contact on a respective wide surface of the plate member with a corresponding wide surface of at least one adjacent plate member, the body opening extending radially within the turbine nozzle or blade, the body opening having an inner dimension and each plate member having an outer dimension sized to frictionally engage the inner dimension of the body opening to damp vibration, wherein the outer dimension of each plate member defines a width that is larger than a thickness of the respective plate member and defines the respective wide surfaces of each plate member.

2. The vibration damping element of claim 1; wherein each plate member of the plurality of stacked plate members includes a central opening therein, and further comprising an elongated body extending within and fixed relative to the body opening, the elongated body extending through the central opening in each plate member of the plurality of stacked plate members.

3. The vibration damping element of claim 2, wherein the plurality of stacked plate members are each cupped and slide freely on the elongated body.

4. The vibration damping element of claim 2, wherein the plurality of stacked plate members is separated into at least two groups; and wherein a retention member on the elongated body engages with an endmost plate member of each group to prevent the respective group from moving relative to a length of the elongated body.

5. The vibration damping element of claim 2, wherein the body opening extends through a body of the turbine nozzle or blade between a tip end and a base end thereof; and wherein the elongated body has a first, free end and a second end fixed relative to one of the base end and the tip end.

6. The vibration damping element of claim 5, wherein the second end of the elongated body is fixed relative to the tip end of the body of the turbine nozzle or blade, and the first, free end extends towards the base end; and further comprising a retention member on the elongated body to prevent the plurality of stacked plate members from moving relative to a length of the elongated body.

7. The vibration damping element of claim 5, wherein the second end of the elongated body is fixed relative to the base end of the body of the turbine nozzle or blade, and the first, free end extends towards the tip end; and further comprising a retention member on the elongated body to prevent the plurality of stacked plate members from moving relative to a length of the elongated body.

8. The vibration damping element of claim 2, wherein the elongated body is hollow along a length thereof, and further comprising:

a cable extending through the hollow length of the elongated body; and a retainer coupled to an end of the cable, the retainer engaging with an endmost plate of the plurality of stacked plate members on the elongated body to retain the plurality of stacked plate members on the elongated body.

9. The vibration damping element of claim 1, further comprising:

a cable extending through the plurality of stacked plate members; and a retainer coupled to an end of the cable, the retainer engaging with an endmost plate of the plurality of stacked plate members to retain the plurality of stacked plate members on the cable.

10. A vibration damping system for a turbine nozzle or blade, comprising:

a body opening extending through a body of the turbine nozzle or blade between a tip end and a base end thereof; and a vibration damping element disposed in the body opening, the vibration damping element including a plurality of stacked plate members within the body opening in the turbine nozzle or blade, each plate member in surface contact with at least one adjacent plate member, wherein the body opening has an inner dimension and each plate member has an outer dimension sized to frictionally engage the inner dimension of the body opening to damp vibration, each plate member also having a thickness that is less than or equal to 10% of a width thereof.

11. The vibration damping system of claim 10, wherein each plate member includes a central opening therein, and further comprising an elongated body extending within and fixed relative to the body opening, the elongated body extending through the central opening of each plate member.

12. The vibration damping element of claim 11, wherein the plurality of stacked plate members are each cupped and slide freely on the elongated body.

13. The vibration damping element of claim 11, wherein the plurality of stacked plate members is separated into at least two groups, wherein a retention member on the elongated body engages with an endmost plate member of each group to prevent the respective group from moving relative to a length of the elongated body.

14. The vibration damping element of claim 11, wherein the body opening extends through a body of the turbine nozzle or blade between a tip end and a base end thereof, and wherein the elongated body has a first, free end and a second end fixed relative to one of the base end and the tip end.

15. The vibration damping element of claim 14, wherein the second end of the elongated body is fixed relative to the tip end of the body, and the first, free end extends towards the base end, and further comprising a retention member on the elongated body to prevent the plurality of stacked plate members from moving relative to a length of the elongated body.

16. The vibration damping system of claim 14, wherein the second end of the elongated body is fixed relative to the base end of the body of the turbine nozzle or blade, and the first, free end extends towards the tip end, and further comprising a retention member on the elongated body to prevent the plurality of stacked plate members from moving relative to a length of the elongated body.

17. The vibration damping system of claim 11, wherein the elongated body is hollow along a length thereof, and further comprising:

a cable extending through the hollow length of the elongated body, and a retainer coupled to an end of the cable, the retainer engaging with an endmost plate of the plurality of stacked plate members on the elongated body to retain the plurality of stacked plate members on the elongated body.

18. The vibration damping system of claim 11, wherein the body opening has a dimension greater than a corresponding outer dimension of the elongated body, allowing the elongated body a limited movement range within the body opening to further dampen vibrations through deflection thereof within the body opening.

19. The vibration damping system of claim 10, further comprising:

a cable extending through the plurality of stacked plate members, and a retainer coupled to an end of the cable, the retainer engaging with an endmost plate of the plurality of stacked plate members to retain the plurality of stacked plate members on the cable.

20. A turbine nozzle or blade comprising the vibration damping system of claim 10.

21. A method of installing a vibration damping element in a body opening in a turbine nozzle or blade, the method comprising:

positioning a cable through a central opening of each of a plurality identical of stacked plate members, each plate member having a thickness that is less than or equal to 10% of a width thereof, the cable including a retainer to retain the plurality of stacked plate members thereon;

positioning a hollow elongated body over the cable and through the central opening of each of the plurality of stacked plate members; and positioning the plurality of stacked plate members with the hollow elongated body and the cable therein into the body opening of the turbine nozzle or blade.

22. The method of claim 21, further comprising removing the elongated body from within the plurality of stacked plate members and the body opening, leaving the plurality of stacked plate members in the body opening.

* * * * *